March 31, 1936.  G. A. SPILLER  2,035,676
BRAKE HEAD
Original Filed July 5, 1934   2 Sheets-Sheet 1
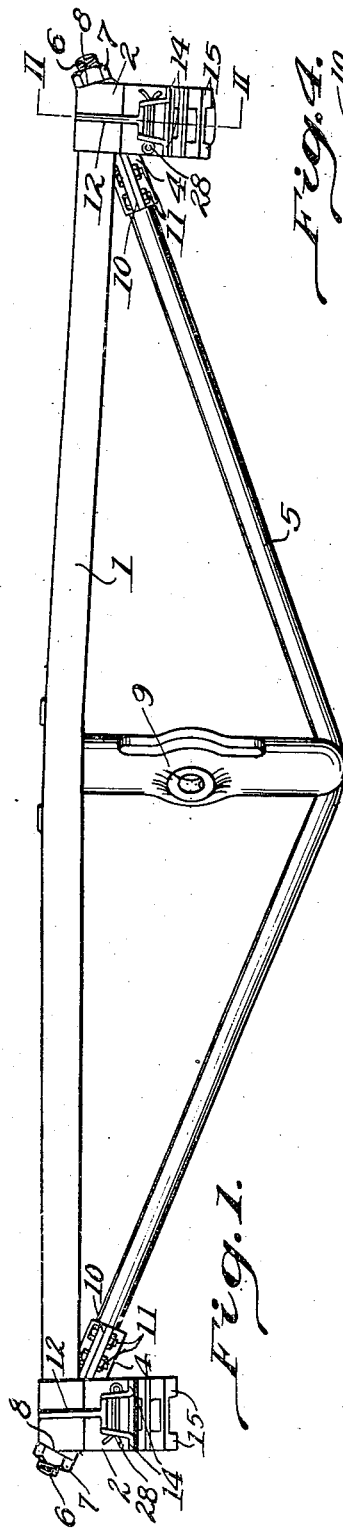
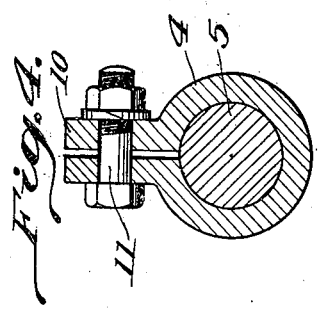
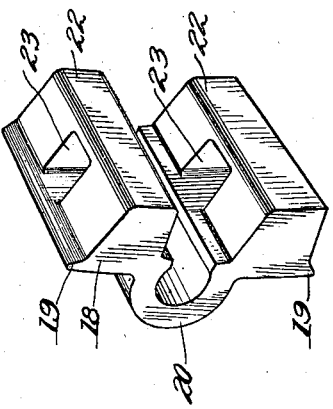
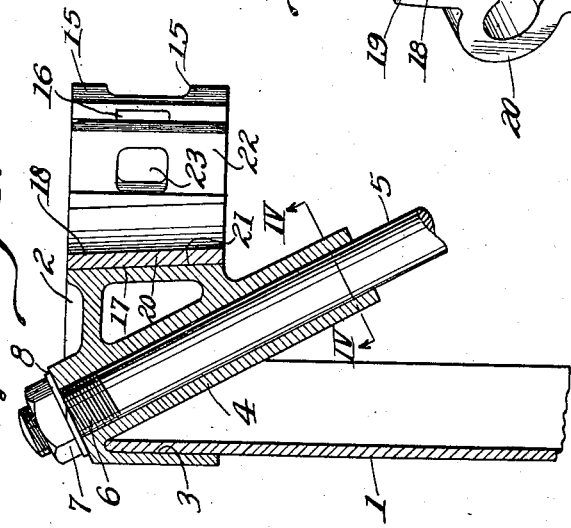
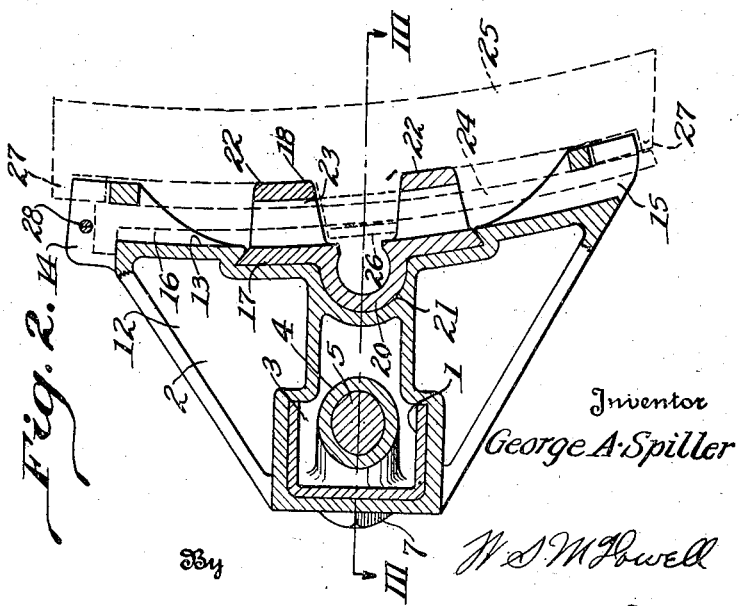
Inventor
George A. Spiller
By W. S. M. Powell
Attorney March 31, 1936.　　　G. A. SPILLER　　　2,035,676
BRAKE HEAD
Original Filed July 5, 1934　　2 Sheets-Sheet 2
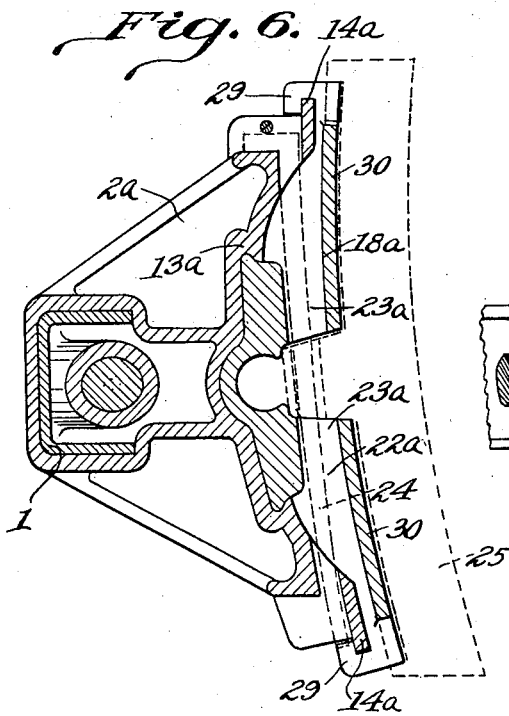
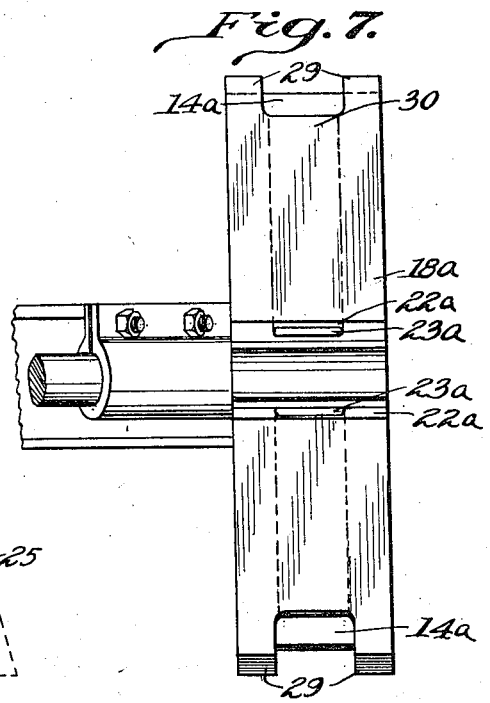
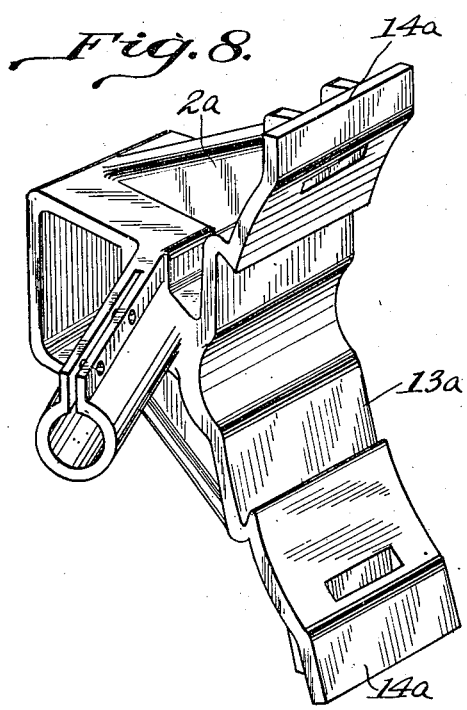
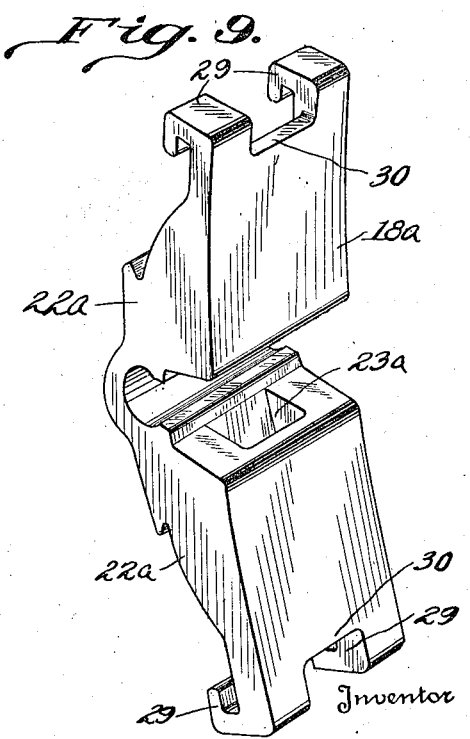
Inventor
George A. Spiller
By W. S. M Howell
Attorney Patented Mar. 31, 1936

2,035,676

UNITED STATES PATENT OFFICE 2,035,676

BRAKE HEAD

George A. Spiller, Columbus, Ohio

Original application July 5, 1934, Serial No. 733,702. Divided and this application August 26, 1935, Serial No. 37,784

2 Claims. (Cl. 188—225)

This invention relates to brake heads of the type used in connection with the rolling stock of railroads, and an object thereof resides in the provision of improved means for uniting such a brake head with the tension rod of the brake beam assembly.

A further object of the invention is to provide the main body of the brake head with a split sleeve in which an end of the tension rod of the brake beam assembly is adapted to be frictionally clamped, whereby in the event of injury or breakage of the usual threaded connection, employed in uniting the ends of the tension rod with the brake beam and the brake heads, means are provided for maintaining said rod under tension until suitable repairs can be made at an appropriate time.

The present application constitutes a division of my prior application, Serial No. 733,702, filed July 5, 1934.

For a further understanding of the invention, reference is to be had to the following description and the accompanying drawings, wherein:

Fig. 1 is a top plan view of the brake beam assembly provided with the brake heads formed in accordance with the present invention;

Fig. 2 is a vertical sectional view taken through the brake head and associated parts on the plane indicated by the line II—II of Fig. 1;

Fig. 3 is a horizontal sectional view taken through the brake head and its associated parts, the plane of the section being indicated by the line III—III of Fig. 2;

Fig. 4 is a transverse cross sectional view on the line IV—IV of Fig. 3 and disclosing the frictional clamp engagement between my improved brake head and an associated torsion rod;

Fig. 5 is a detailed perspective view of the renewal insert employed by the brake head comprising the present invention;

Fig. 6 is a vertical transverse sectional view taken through another form of brake head embodying the features of the present invention and wherein the renewable insert section is of extended form to receive the entire wear which takes place between the brake shoe and the brake head;

Fig. 7 is a front view of the mechanism disclosed in Fig. 6;

Fig. 8 is a perspective view of the main body of the brake head when constructed to receive the type of insert disclosed in Fig. 6;

Fig. 9 is a similar view of the insert section as disclosed in Fig. 6.

Referring more particularly to the drawings, there is disclosed in Fig. 1 a brake beam assembly comprising the usual brake beam 1, which is substantially channel shaped in cross section and to the ends of which are secured the brake heads 2 comprising the present invention. Each of these brake heads is formed from a casting composed of malleable iron or cast steel and embodies a substantially rectangular socket 3 shaped for the reception of the adjoining end of the brake beam 1. Within the socket 3, the brake head is formed with an angularly extending bearing 4 in which is positioned the complemental end of a tension rod 5 of standard design. This rod, as usual, has its ends threaded as at 6 for the reception of nuts 7 which cooperate with the surfaces 8 of the brake heads to retain the rod 5 under the required tension conditions. The brake beam assembly also includes a central strut 9 located between the central portions of the brake beam 1 and the tension rod 5, as is customary.

One of the features of the present invention resides in forming the integral bearing 4 of each of the brake heads 2 so that said bearing will be split throughout a portion of its length. This split portion is formed with flanged enlargements 10 adapted for the reception of threaded fastening devices 11, by means of which the split portions of said bearings may be frictionally clamped into firm holding engagement with the adjoining portions of the tension rod 5, so that said tension rod may be firmly held in connection with the brake heads even though if for any reason the nuts 7 should become loosened or broken from connection with the tension rods. Failure of the rods 5 frequently occurs and with the use of customary construction, the tension rod is released and allowed to drop, thereby in many instances causing wrecks or car derailments. By the features of the present invention, the probabilities of such an accident are greatly minimized.

Integrally formed with the walls of the socket 3 and the bearing 4 of each brake head is a vertical reenforcing web 12 which terminates forwardly in an integral, transversely extending, substantially arcuate face 13, formed with spaced upper and lower sets of integral projections 14 and 15, between which is formed an arcuate key way 16. Provided in the face 13 midway of its length, and disposed between the projections 14 and 15, is a dovetailed recess 17, the walls of which slightly taper in a converging direction toward the inside of the brake head.

Arranged to be removably received within the recess 17 is an insert section 18, the construction of which is shown more particularly in Figs. 2, 3 and 5. This insert section comprises a cast metal body provided with a tongue including flanges 19 which engage with and conform to the shape of the tapering walls of the recess 17.

Centrally, the section 18 includes a rearwardly extending semi-circular bearing web 20, which is seated within a similarly shaped socket 21 formed in the brake head and constituting a continuation of the central region of the recess 17. The bearing web 20 is adapted to receive the usual hangers, not shown, by means of which the brake beam is pivotally supported for swinging movement toward and away from associated car wheels. The insert section is additionally formed to include the integral upper and lower key receiving lugs or abutments 22 which, in the standard type of brake head, are integrally and inseparably formed with the body of the brake head. By this construction, it will be seen that the insert section may be forced from the outer surface of the brake head into its operative position within the recess 17 and the socket 21, the taper of the recess and socket walls serving to retain the insert section in proper operative alignment with the body of the brake head. In addition, the lugs 22 are provided with the usual vertically disposed and registering sockets or openings 23 which receive an arcuate brake shoe retaining key 24 of conventional design.

Associated with the brake head in the usual manner is a brake shoe 25 which has its inner surface provided with the usual apertured lug or yoke 26, which is arranged to be positioned between the lugs 22 and retained in such position by the key 24. The upper and lower ends of the brake shoe are provided with offset rearwardly extending projections 27 which register with the outer portions of the brake head projections 14 and 15. The locking key may be retained in place by a cotter pin 28, which passes transversely through openings formed in the upper set of projections 14 and overlies the offset upper end of the key 24.

With the use of this construction, when excessive wear takes place on the upper surface of the lower of the lugs 22, the insert section may be removed from association with the brake head by first removing the cotter pin 28 and the key 24. This allows the separation of the brake shoe 25 from the insert section and by outwardly directed pressures, delivered by a hammer or other percussion tool, the insert section containing the defective lower lug, may be driven from its wedged seating engagement with the recess 17 and the socket 21. It will be observed that this can be accomplished without removing the brake head from the brake beam, as has been required heretofore, or otherwise affecting the operating positions of the brake beam. Since, as stated, the greatest wear usually takes place on the lower lug, further use of the insert section may be obtained by merely reversing its position in an associated brake head so that the upper lug during initial operation by reversal in the arrangement of the insert section may be used as the lower lug. This can easily be accomplished by transferring the insert section from one side of the car to the other, thus adapting the insert section to the taper of its receiving sockets in the brake head proper and providing for maximum duration of service from each insert section. It will also be noted that these advantages are obtainable with minimum change in conventional railroad brake rigging.

The construction of the brake head comprising the present invention is applicable to standard brake beams, tension rods, brake shoes and shoe keys, the departures of the present invention from standard practice occurring entirely in the brake head itself. This enables the brake head comprising the present invention to be substituted for the standard brake head and used interchangeably therewith. The construction of the present brake head including its removable insert section enables brake head repairs to be made quickly, at low cost and without requiring the removal of railroad cars from service. Inasmuch as it has been my experience that brake beam failures are accountable for approximately ten per cent of all cars being shopped for repairs on all the railroads, the savings afforded by the present invention with respect to both time and material will be evident.

A greater degree of protection to the brake head from brake shoe wear is afforded by the construction disclosed in Figs. 6 to 9 inclusive. In this form of my invention, the insert section 18a extends the full length of the face 13a of the brake head 2a so that the brake shoe 25 will not contact with the body of the brake head at any point, the wear being taken up on all points by the insert section 18a. This is accomplished by so forming the insert section 18a as to include the hook-shaped fingers 29 which slip over and engage with the projections 14a of the brake head 2a. The fingers 29 are united by transversely extending webs 30 which are so positioned relative to the openings 23a in the lugs 22a as to constitute guides for the reception of the key 24.

It will be understood by those skilled in the art that my improved brake head may be further modified to obtain the advantages above set forth without departing from the spirit and scope of the invention as the latter has been defined in the following claims.

What is claimed is:

1. In brake rigging for railroad trucks, a brake beam, brake heads positioned upon the ends of said beam, a tension rod provided with threaded ends arranged to project through bearings formed in said brake heads, nuts carried by the threaded ends of said tension rod, and supplemental clamping means formed in connection with the bearings of said brake heads for securing the ends of the tension rods in connection with said brake heads.

2. In a brake head, a body formed to include a socket for the reception of the end of an associated brake beam, a bearing formed with said body for the reception of the end of an associated tension rod, and friction applying clamping means formed with said bearing for positively securing the latter to a tension rod passing through the bearing.

GEORGE A. SPILLER.